US011891798B1

(12) United States Patent
Dimanshteyn et al.

(10) Patent No.: US 11,891,798 B1
(45) Date of Patent: Feb. 6, 2024

(54) METHOD AND APPARATUS FOR VACUUM THERMAL AND ACOUSTICAL INSULATION

(71) Applicants: Felix A Dimanshteyn, West Hartford, CT (US); Adam Dimanshteyn, West Hartford, CT (US)

(72) Inventors: Felix A Dimanshteyn, West Hartford, CT (US); Adam Dimanshteyn, West Hartford, CT (US)

( * ) Notice: Subject to any disclaimer, the term of this patent is extended or adjusted under 35 U.S.C. 154(b) by 0 days.

(21) Appl. No.: 15/931,507

(22) Filed: May 13, 2020

(51) Int. Cl.
*E04B 1/90* (2006.01)
*E04B 1/86* (2006.01)
*E04B 1/80* (2006.01)
*E06B 3/66* (2006.01)

(52) U.S. Cl.
CPC ................ *E04B 1/90* (2013.01); *E04B 1/803* (2013.01); *E04B 1/86* (2013.01); *E06B 3/6612* (2013.01)

(58) Field of Classification Search
CPC ... E04B 1/90; E04B 1/803; E04B 1/86; E04B 2001/7691; E06B 3/6612; E06B 3/66304; E06B 3/6775; E06B 2003/6638; Y02A 30/242; Y02A 30/24
See application file for complete search history.

(56) References Cited

U.S. PATENT DOCUMENTS 1,955,443 A * 4/1934 Spafford ................... E04B 1/62 411/965
3,990,201 A * 11/1976 Falbel ................. E06B 3/66304 52/171.3
5,596,981 A * 1/1997 Soucy ..................... F24S 70/60 126/704
6,506,272 B1 * 1/2003 Aggas .................. E06B 3/6612 156/109
10,280,118 B1 * 5/2019 Dimanshteyn ......... C09K 21/02
2001/0012545 A1 * 8/2001 Nalepka .............. E06B 3/66333 428/34
2009/0179541 A1 * 7/2009 Smith ..................... B29C 63/02 312/406
2011/0296771 A1 * 12/2011 Miller ..................... E06B 3/673 52/171.3
2021/0277652 A1 * 9/2021 Herranen ............. F16L 59/065

FOREIGN PATENT DOCUMENTS

CN 204435595 U * 7/2015
CN 108275893 A * 7/2018
DE 152180 A5 * 7/1980 ............. F16L 59/05
JP 2004324135 A * 11/2004
KR 101884849 B1 * 1/2017

* cited by examiner

*Primary Examiner* — Brian D Mattei
*Assistant Examiner* — Omar F Hijaz

(57) ABSTRACT

Method for producing an adjustable vacuum thermal and acoustical insulation panels comprise steps of manufacturing first and second vacuum telescoping insulating panels. The process of making a vacuum thermal and acoustical insulation system for modifying space intended to use for existing thermal insulation in some embodiments is comprised of the steps of providing air impermissibility for an existing space by covering internal surfaces of studs, joist, rafters and walls and space between them with sealant and coating and lining all these surfaces.

1 Claim, 4 Drawing Sheets

PRIOR ART

METHOD AND APPARATUS FOR VACUUM THERMAL AND ACOUSTICAL INSULATION

TECHNICAL FIELD

The present invention is generally directed to insulation of thermal and acoustical insulation. More particularly, the present invention is directed to improvements in the efficacy of such insulation. Even more particularly, the present invention is directed to embodiments that compactly integrate with existing structures such as buildings as well as aircraft.

BACKGROUND OF THE INVENTION

The prior art includes structures that utilize a vacuum for thermal and acoustical insulation. For example, the common thermos or Dewar flask uses this technology.

A vacuum slows down heat transfer by two of the three modes of heat transfer: conduction, convection, and radiation. More specifically, if we remove most of the air molecules from a space, as occurs when we draw a vacuum, we largely eliminate the first two of those heat transfer mechanisms.

Conduction is the flow of heat from molecule to molecule. It's the reason a cast iron skillet handle heats up, but thermal conduction also occurs across a layer of air, as kinetic is transferred from one air molecule to the one next to it. Removal of most of those air molecules by evacuating air results in far less conductive heat flow.

Convection is the transfer of heat by moving molecules from one place to another. Warm air rises, and these convection currents carry heat, for example, this is the primary means that heat is delivered to a room from baseboard convectors (often called radiators). In a vacuum there are far fewer air molecules so convection of heat nearly stops.

The prior art includes panels manufactured by NanoPore Insulation LLC having an address in Albuquerque, NM 87106. The most common use of NanoPore™ Thermal Insulation is in the form of a vacuum insulation panel or VIP. VIPs are made by sealing the thermal insulation in a barrier film under a vacuum. The barrier film is formed into a pouch in which the panel insert is put inside before the unit is evacuated and heat sealed. The sealed edges of the barrier film create a flap of the film which extends out from the edges of the panel which are folded and taped against the panel in use NanoPore employs a variety of barrier films depending on the cost, temperature, and lifetime requirements of the customer. The barrier film most often used is a three-layer laminate with aluminum metallization on two of the layers to enhance barrier performance. Because the metallization layer is so thin there are no significant edge effects caused by conduction along the film of the kind that can occur in foil type barrier films. Due to the moderate (<5 mbar) vacuum levels required for optimum performance of NanoPore™ VIPs, barrier film with higher permeability values than those commonly used in foam-based VIPs are used to achieve the same lifetime. Depending on the variety of barrier film used and the application, VIP lifetimes are from several months to over 20 years.

NanoPore's VIP thickness can range from slightly over 1⁄16" (2 mm) to over 1 ½" (40 mm), and individual panel size from less than 1" (25 mm) square to a maximum size of 22" (560 mm)×28" (711 mm) are made. Larger areas are covered by tiling individual panels together to cover the surface. Custom sizes and complex shapes are made possible by a combination of pre-shaping the insert before evacuation and tiling of finished panels. Although it is not currently possible to achieve pass-throughs or inside corner cut-outs in our VIPs, the necessary shape can usually be achieved by using a combination of panels instead of a single piece. For cylindrical applications like tubing or pipes, NanoPore™ VIPs can often be formed to the required shape through some techniques.

Only radiant heat flow occurs to a significant extent in a vacuum, because radiation is not dependent on air molecules. Low thermal emissivity is important in vacuum panels. Low thermal emissivity) refers to a surface condition that emits low levels of radiant thermal (heat) energy. All materials absorb, reflect, and emit radiant energy according to Planck's law but here, the primary concern is a special wavelength interval of radiant energy, namely thermal radiation of materials. In common use, especially building applications, the temperature range of approximately −40 to +80 degrees Celsius is the focus, but in aerospace and industrial process engineering, much broader ranges are of practical concern.

Emissivity is the value given to materials based on the ratio of heat emitted compared to a perfect black body, on a scale from zero to one. A black body has an emissivity of 1 and a perfect reflector has a value of 0.

Kirchhoff's law of thermal radiation states that absorption equals emissivity opaque for every specific wavelength/frequency (materials often have a quite different emissivity at different wavelengths). Therefore, if the asphalt has an emissivity value of 0.90 at a specific wavelength (say wavelength of 10 micrometers, or room temperature thermal radiation), its thermal absorptance value would also be 0.90. This means that it absorbs and emits 90 percent of radiant thermal energy. As it is an opaque material, the remaining 10 percent must be reflected. Conversely, a low-e material such as aluminum foil has a thermal emissivity/absorptance value of 0.03 and as an opaque material, the thermal reflectance value must be 1.0–0.03=0.97, meaning that it reflects 97 percent of radiant thermal energy. Low-emissivity building materials include window glass manufactured with metal-oxide coatings as well as house wrap materials, reflective thermal insulations, and other forms of radiant thermal barriers.

A conventional thermos bottle has a very shiny, low-emissivity (low-E), inner surface that helps to reduce radiant heat transfer; the same sort of low-e surface is included in various vacuum insulation panels.

The net result is that an inch-thick vacuum insulation panel can provide a center-of-panel insulating value of R-25 or even more compared with R-6 to R-7 for standard rigid foam insulation.

An important concept related to thermal and acoustical insulation is the "hardness" of a vacuum. The key property of a vacuum is its pressure or how "hard" it is. We often measure that with Torr units. One Torr is exactly 1/760th of a standard atmosphere ($1.3\times10^{-3}$ atm), or approximately 1 mm of mercury. With a very hard vacuum, more of the air molecules are sucked out, resulting in a greater negative pressure. The walls of a typical thermos bottle contain a relatively hard vacuum of $10^{-6}$ Torr. With such a hard vacuum, that thermos bottle can keep coffee hot all day. By comparison, the vacuum in a flat vacuum insulation panel is typically no more than 1/1000th as strong ($10^{-3}$ Torr).

The key property of a vacuum is its pressure or how "hard" it is. We often measure that with Torr units. One Torr is exactly 1/760th of a standard atmosphere ($1.3\times10^{-3}$ atm), or approximately 1 mm of mercury. With a very hard vacuum, more of the air molecules are sucked out, resulting in a greater negative pressure. The walls of a typical thermos bottle contain a relatively hard vacuum of $10^{-6}$ Torr. With such a hard vacuum, that thermos bottle can keep coffee hot all day. By comparison, the vacuum in a flat vacuum insulation panel is typically no more than 1/1000th as strong ($10^{-3}$ Torr).

The harder the vacuum, the more difficult it is to maintain it. Thermos bottles are made with a cylindrical design for optimal strength. With flat panels, it's very hard to achieve comparable strength and maintain such a hard vacuum—particularly at the edges.

There are on the market different kinds of thermal insulation. Most common insulation fiberglass insulation has R-value under 4. Foam type insulation such as Styrofoam has an R-value in a range around 4 and polyurethane has an R-value in a range around 7.0. But the R-value of vacuum panels is in a range around 50 or higher. That means that heat from inside a room will almost entirely not transfer through a vacuum panel. Additionally, when the temperature outside is substantially higher than inside of a room, this heat will almost entirely not transfer through a vacuum panel. Thus, a system of vacuum insulation panels can enable superior heat protection.

A recently marketed vacuum insulated panel is made by Dow Corning having an address at 2200 West Salzburg Road; Midland, MI 48686-0994. This panel, not yet widely available, is one inch thick and has a center-of-panel insulating value of R-39 and a "unit R-value" (accounting for the edges) of R-30, according to the company.

The Dow Corning product has a core made of fumed silica cake, a remarkable "microporous" material that provides R-8 per inch even without a vacuum. This material allows a very high insulating value even with a softer vacuum. The core is reinforced with silicon carbide and polyester fibers for structural support, and it is encased in an inner layer of polyethylene and an outer layer of polyethylene, polyester, and aluminum. The panels are vacuum-sealed, and the edges are heat-sealed.

According to an Environmental Building News article, these Dow Corning panels should cost $10-12 per square foot. At that cost, I believe VIPs are very practical for those appliance and exterior door applications noted above.

From the above, it is therefore seen that there exists a need in the art to overcome the deficiencies and limitations described herein and above.

SUMMARY OF THE INVENTION

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. Although specific features of various exemplary embodiments of the invention may be shown in some drawings and not in others, this is for convenience only. In accordance with the principles of the invention, any feature of a drawing may be referenced and/or claimed in combination with any feature of any other drawing.

The invention, however, both as to organization and method of practice, together with the further objects and advantages thereof, may best be understood by reference to the following description taken in connection with the accompanying drawings in which.

DETAILED DESCRIPTION

The vacuum insulation in accordance with the present invention will facilitate desired and necessary heating and cooling to the desired temperature in a house or any building with substantially less energy.

Figure 1:
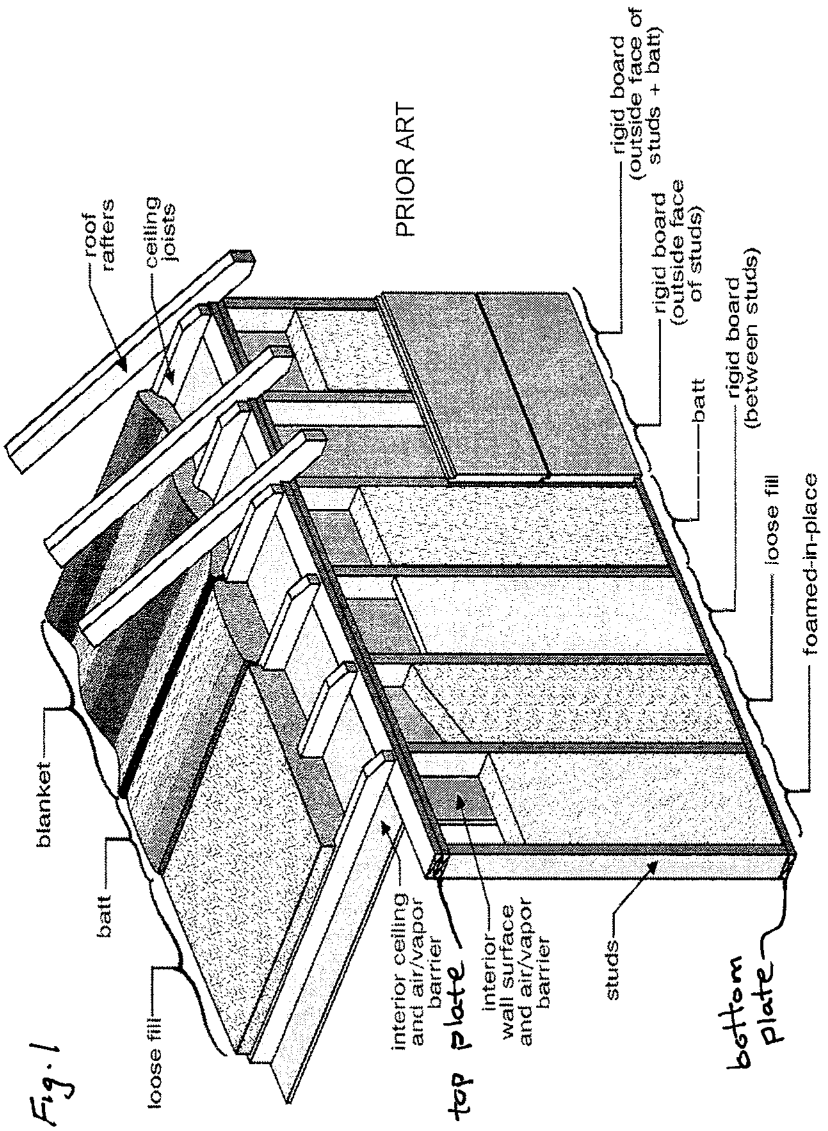
FIG. 1 is a partly schematic view of the prior art insulation in a residential building that provides insight into the location of the apparatus in accordance with the present invention.

FIG. 1 is a schematic view of an embodiment of a single 3-dimensional chamber 12 connected by a tube and valve assembly 16 to a vacuum pump 14. For simplicity, only a single chamber 12 is shown. Ordinarily, other embodiments of the present invention also simultaneously connect a plurality of such chambers 12 to a vacuum pump 14. Ordinarily, each chamber is connected to the vacuum pump 14 by a tube and valve assembly 16. The valve may be a check valve that only allows the exit of air out of the chamber 12. Other embodiments utilize an isolation valve. Some embodiments may use a manifold or plenum for connection of each chamber to the vacuum pump.

The chamber 12 in FIG. 1 is a schematic view of an embodiment of a single chamber. In some embodiments of the present invention one or more chambers each connected to a vacuum pump 14 by a tubing 15 and a valve 16 is positioned within space (a) created during the construction of the building as exemplified by, for example by FIG. 3 or (b) by repurposing a space originally intended, for example, blankets of insulation or loose-fill insulation (illustrated, for example, by FIG. 2) and sealing that space as described herein in a building to accommodate a vacuum for insulation purposes. FIG. 1 schematically illustrates the communication between each chamber 12 connected to a vacuum pump 14 with, for example, a tube or pipe 15 in series with a valve 16 (In the illustrated embodiment axial sections of tubing 16).

It will thus be seen that the chambers provide superior acoustical and thermal insulation because of the hard vacuum possible with the present system.

All insulation in houses, as well as other buildings, can be achieved by construction with pluralities of vacuum insulating panels and/or modification of the existing space for insulation to vacuum insulation space system which defines as chambers in accordance with the present invention.

In one embodiment utilized in residential buildings, vacuum insulating panels are installed between studs, joists, or rafters. In these vacuum insulating panels are installed valve connector and that allows to connect one to another by hoses/tubing and these hoses/tubing should ultimately connect to a vacuum pump. The interconnection results in the pressure within all the panels being identical if there is no leak within the system.

These vacuum insulating panels constructed in the manner described herein will pass all fire tests required by buildings codes. More specifically, the panels will pass certain fire tests included but not limited to ASTM E-84, ASTM E-119, FM 4880, NFPA286, UL 1715 as well as thermal barrier tests.

Individual chambers are made from at least of one of the materials from the group consisting of thermoplastic materials, thermosetting materials, metal, glass, glass fabric, cement/concrete, silicon, wood, plywood, rubber, plexiglass, fabric, plaster of paris, and ceramic-like materials which are made airtight using sealing and coating or any other means and combination of them.

Ceramic like materials can include a mixture of:

Binders selected from the group consisting of sodium and/potassium silicates. Fillers, selected from the group consisting of such as clay, wollastonite, mica, perlite, vermiculite, borax, alumina, chopped fibers, glass, microspheres, concrete/cement, plaster of paris and silica.

In the mixture of binders and fillers, a curing agent should be placed. Curing selected from the group consisting of agents, sodium bicarbonate, potassium bicarbonate, and plaster of paris are used.

If necessary, the materials used for vacuum insulation panels in accordance with the present invention are reinforced.

To satisfy fire test requirements, sometimes only one side of the panel is made from materials that will pass fire tests such as metals, concrete, ceramic type of materials, and others.

In another embodiment vacuum insulating panels are installed on the roof, floors and/or in the attic. In this application, they should be made strong enough to withstand people working on the roof and any equipment. These vacuum insulating panels should also be able to pass all fire tests required by buildings codes.

The creation of a system of vacuum insulating panels will provide necessary heating and cooling temperatures in any house or building, of any construction.

A plurality of vacuum insulating panels in a given building will include a valve 16 in each panel connected with a hose/tubing 15 connected to a vacuum pump 14. Typically, in a small house, all vacuum insulation panels will have a connection to the vacuum pump 14 meaning there is a connection (directly or indirectly) between a single vacuum pump and any such panels. For office buildings, a multiplicity of sets of vacuum insulating panels will each be connected to respective vacuum pumps. This will allow the maintenance of a suitable, sustained vacuum in panels for any length of time.

Methods of production for Vacuum insulating panels:

Vacuum insulating panels are made in any shape and any size depending on the application.

1. Vacuum insulating panels are made by molds.
2. Vacuum insulating panels are made from materials by stamping (pressurizing) or heating and stamping (pressurizing).
3. Vacuum insulating panels, in some embodiments, are made from two parts, namely, a body and a lid:
   a. The body of a typical vacuum insulating panel is made in the shape of an open box with the required sizes for length, width, and height. Height is adjusted by bending sheets to the desired size. A multiplicity of sizes is desirable to facilitate accommodation with the very significant intricacies of unique buildings.
   b. The top of the box is covered with a lid. The lid is made as a planar sheet or in the shape of a box, which has the same perimeter as the body box. The external size of the lid box should be slightly smaller than the internal size of the body box so that it may slide inside.

In all cases, vacuum insulating panels should have an installed valve connector in each panel and that allows to connect with each other by hoses/tubing and these hoses/tubing should ultimately connect to a vacuum pump.

Vacuum insulating panels are made in a plurality of sizes to allow cooperation with the unique possible places for installation. This are achieved in several ways:

a. Vacuum insulating panels are made from two parts which may have the same perimeter profile. The external size of one part should be slightly smaller than the internal size of the second part allowing the first to slide into the second. In this case, vacuum insulating panels are made in any range of parts size. These two parts should be made air-impermeable using sealant and coating.
b. Vacuum insulating panels of the same size are cut to the necessary size to blend two pieces of vacuum insulating panels together. These two parts should be made air-impermeable using a sealant, coating, and a lining.
c. Vacuum insulating panels each have a valve connector that connects to hoses/tubing which connects to a vacuum pump 14.

In the example of the vacuum insulating panels in FIG. 1, axial sections of hose/tubing 15 provide a connection between panels and a vacuum pump.

If panels do not have leaks, the vacuum pump does not need to operate. However, as a total absence of leaks is very improbable, the connection to the vacuum pump is likely to be utilized. In case of leakage, the vacuum pump will start to operate to remove air.

In houses, insulating panels are installed between studs, joists, and/or rafters. In this case, the sizes of panels will be determined by the size and distance between adjacent studs, joists, rafters.

The conventional cover for insulation (such as foam, fiberglass) is sheetrock which has insignificant insulating properties but provides fire protection. The best polyurethane foam insulation has an R-value of around 7. Vacuum insulating panels and vacuum insulating space systems (chambers) can provide fire protection as a thermal barrier and can have R-values up to 50.

Vacuum insulating panels are made from materials that can withstand high temperature and pass all fire tests including ASTM E-84, FM 4880, NFPA286, and UL 1715. These materials should also pass the Thermal Barrier test ASTM E-119.

To pass these tests, the materials for these panels should function at very high temperatures up to 2000 F or higher.

Other embodiments of the present invention apply to cars, trucks, RVs, and aircraft.

The vacuum insulating system of the present invention utilizes at least one material selected from the group consisting of thermoplastic, thermosetting, metal, glass, glass fabric, cement/concrete, silicon, wood, plywood, rubber, plexiglass, fabric, and/or ceramic-like materials. Such materials make the VIP airtight using sealing and coating or any other means and combination of them.

Ceramic like materials can include a mixture of:

Binders, such as sodium and/potassium silicates.

Fillers, such as clay, wollastonite, mica, perlite, vermiculite, borax, alumina, chopped fibers, glass, microspheres, cement, and silica.

Curing agents can include sodium bicarbonate, potassium bicarbonate, plaster of Paris. Cement and plaster of Paris are also used as binders.

If necessary, the materials for vacuum insulation panels are reinforced.

Coating

In another embodiment: existing spaces for insulation are modified into a vacuum insulating space system (chambers) in accordance with the present invention. More particularly, modification of existing structures enables that modified structure to be, for example, a 3-dimensional chamber that is impermeable by air. In each chamber, a valve connector is installed which connects with hoses/tubing which connects to a vacuum pump. Each valve connector includes an inlet pipe that connects the valve connector to hoses/tubing and outlet pipe which installed in the body of the chamber and connected to the vacuum space.

In houses, the vacuum insulation space system is made using existing structures such as installed studs, joists, rafters connected to the walls which are now used for existing thermal insulation. These studs, joists, and/or rafters are typically connected on one side to the wall made from plywood or other materials. The other side of the studs, joist, and/or rafters are covered with a lid made with any of the materials described below. To make these systems air-impermeable, all 3-dimensional chambers are sealed and coated with air-impermeable sealant and coating as described herein.

Figure 2:
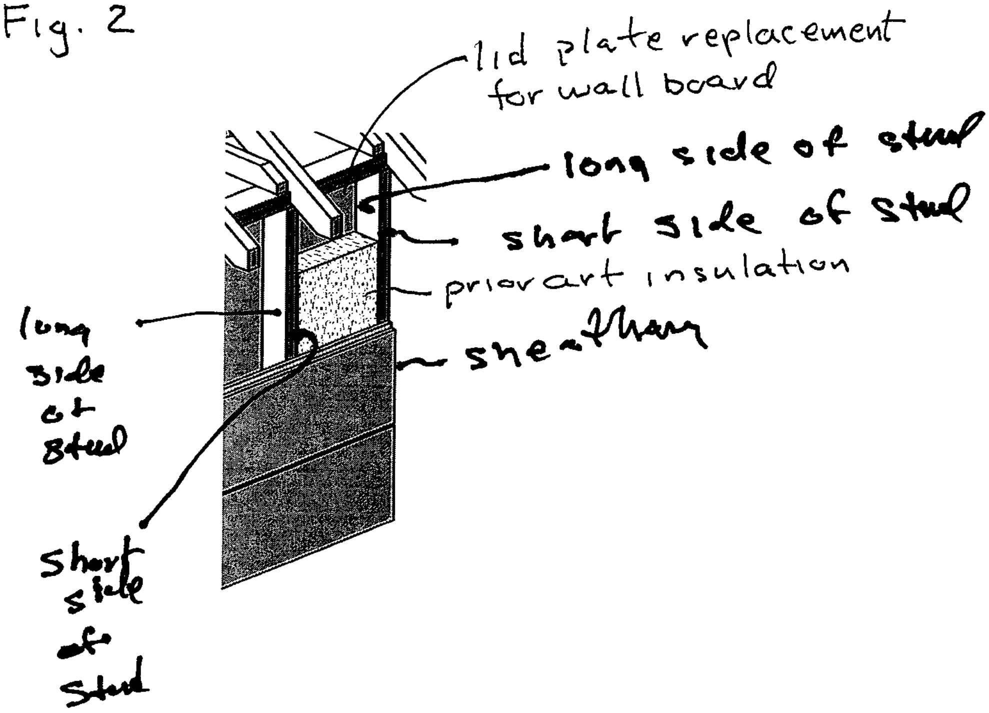
FIG. 2 is an enlarged view of a portion of FIG. 1 illustrating the placement of the lid panel, the long and short sides of studs in the prior art as well as the orientation of the long and short sides with respect to the interior and exterior of the building.

FIG. 2 is a partly schematic view of the prior art insulation in a residential building that provides insight into the location of the apparatus in accordance with the present invention.

Covering the entirety of the chamber structure with an air-impermeable sealant and coating is accomplished by spraying or by any other means.

For houses, the chambers of the vacuum insulating system are preferably made from materials that can withstand high temperatures and should pass fire tests such as ASTM E-84, FM 4880, NFPA286, UL 1715. The vacuum insulating system should also pass the Thermal Barrier test ASTM E-119. In this case, lids will tolerate high temperatures and/or fire.

A suitable sealant and coating may be comprised of thermoplastic, thermosetting chemicals such as epoxy, polyester, polyurethane, latexes, rubber, silicone, cement, and plaster of paris. The sealant and coating can also be comprised of ceramic type materials described in Inventor patents:

Ceramic like materials in embodiments of the present invention are a mixture of:

Binders, such as sodium silicates, potassium silicates, concrete and plaster of paris;

Fillers, such as clay, wollastonite, mica, perlite, vermiculite, borax, alumina, chopped fibers, glass, microspheres, cement and silica and Curing agents can include sodium bicarbonate, potassium bicarbonate, plaster of Paris.

Lining

In addition to sealing and coating, these chambers in some embodiments have their air impermeability further enhanced with a lining. For existing spaces, surfaces of the chamber are lined with films and layers of materials which will cover the entire surface area and adhere to these surfaces.

Lining materials can be made in the form of open boxes. In the case of existing space, these boxes should be placed on the wall between studs, joists, and rafters and should be adhered to them. The open space should be covered with a lid. This lid should be connected to the vacuum insulation space system with sealant and coating to make this chamber not permeable to air. This lid should withstand high temperatures to pass all necessary fire.

Lining materials for a vacuum insulating system can include at least one material selected from the group consisting of thermoplastic and thermosetting materials, metal, glass, glass fabric, films, cement/concrete, silicon, wood, plywood, rubber, plexiglass, fabric, and ceramic-like materials which are made airtight using sealing and coating or any other means and combination of them. A preferable material for this purpose is fiberglass saturated in polyester adhered to the surfaces.

The sealant and coating are selected from the group consisting of thermoplastic or thermosetting chemicals such as epoxy, polyester, polyurethane, latexes, rubber, silicon, concrete, and plaster of Paris as well as the ceramic type material described in United States patents issued to the applicant herein namely 7,744,783; 10,280,118; 10,407,346 which are incorporated by reference.

Ceramic like materials include one or more binders, such as sodium and/potassium silicates and fillers, such as clay, wollastonite, mica, perlite, vermiculate, borax, alumina, chopped fibers, glass, microspheres, and silica. Concrete and plaster of paris are also used as binders.

Ceramic like materials include one or more curing agents selected from the group consisting of sodium bicarbonate, potassium bicarbonate, and plaster of paris.

All of the chambers and the walls of the tubing connections between the chambers must be air impermeable. For example, a chamber formed by adjacent studs, joists, rafters, and walls must be air impermeable. That is achieved by sealant and coating walls, studs, joists, rafters, and the connections between them. In each of these chambers, there is installed a valve connector and that allows connect one to another by hoses/tubing and these hoses/tubing ultimately connect to a vacuum pump.

The open side of this chamber is covered with a lid made with any materials described above. To make these systems air-impermeable, all parts should be sealed and coated with air-impermeable sealant and coating.

These materials should also pass thermal barrier tests such as ASTM-119 and other fire tests described above. After removing air from this closed space, it will function as thermal and acoustical vacuum insulation.

The chambers, linings, and panels of the vacuum insulating system are, in some embodiments, manufactured with a mold.

Another embodiment of the present invention provides an aircraft fuselage exterior wall incorporating a vacuum insulating system. In this embodiment, it is necessary to make this system impermeable to air by using sealant and coating. In an airplane, in addition to sealing and coating, spaces between the body and internal wall are lined with materials which will provide additional air impermeability.

Another embodiment of the present invention provides ships and cruise ships with a vacuum insulating system. A vacuum insulating system can be made from an exterior wall (body) and an interior wall. In this embodiment, it is necessary to make this system impermeable to air by using sealant and coating. In ships and cruise ships in addition to sealing and coating, spaces between the body and internal wall are lined with materials which will provide additional air impermeability.

In an embodiment for use on a residential building or similar commercial building, the space between studs, joists, and rafters will determine the space which is utilized for vacuum insulating panels or vacuum insulation space system. In some embodiments the space defined, for example, the studs and walls are provided with a coating and lining whereby a plurality insulating vacuum chambers are formed in situ. In other embodiments vacuum insulating panels dimensioned and configured to fit between the studs, joists, or rafters.

In another embodiment: two sheets of a material selected from the group consisting of glass, plexiglass, plastics are used as a vacuum insulating system. Around the edges of these sheets should be placed a frame that will hold them together and should be impermeable for air. The frame can have grooves for sheets which will determine the distance between sheets.

Embodiments of the vacuum insulating system in accordance with the present invention are made from at least of one material from thermoplastic and thermosetting chemical mixtures, metal, glass, glass fabric, cement/concrete, silicon, wood, plywood, rubber, plexiglass, fabric, and ceramic-like materials which are made airtight using sealing and coating or any other means and combination of them.

If necessary, materials for vacuum insulation panels are reinforced. Any used materials should provide strength and protection against high temperatures and fire.

In another embodiment concrete panels for walls, sealings, and floors are modified to a vacuum insulating system. In the process of making concrete panels, hollow space should be made inside for vacuum insulation. The dimensions of this hollow space should be made with the required length and width for the vacuum insulating system. The thickness of the vacuum insulation space is determined by the necessary vacuum. Typically, the thickness is in the range of 0.3-6.0 in. or more. A valve connector is installed in the concrete and connects the vacuum insulating space with a vacuum pump directly or through hoses/tubing.

In some embodiments each panel, grooves are made throughout its length for two glass sheets which are installed in these grooves on the top of the panel. The side and top of the edge of glass should be connected to a frame. This closed system will be made impermeable to air by sealing and coating all edges. In the frames are install valve connectors to connect a two-glass system with hoses/tubing which connected to the vacuum pump.

Figure 3:
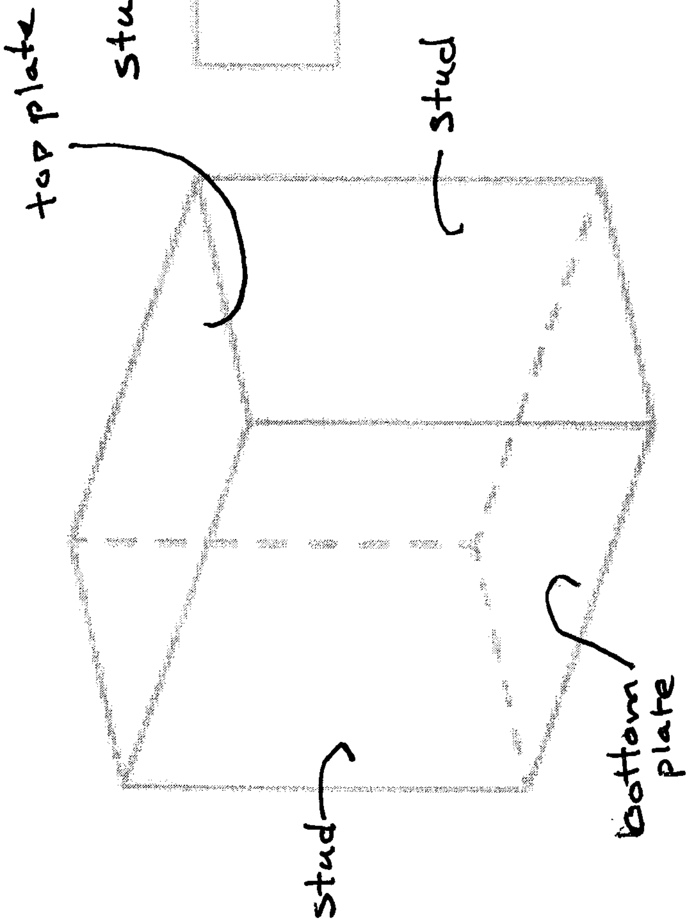
FIG. 3 is a schematic view (not to scale) showing the faces of the bottom plate, two parallel spaced apart studs and the top plate. It will be understood that these faces correspond exactly with the faces of the studs, bottom plate and top plate defining the space for conventional insulation as shown in FIG. 1.
Figure 5:
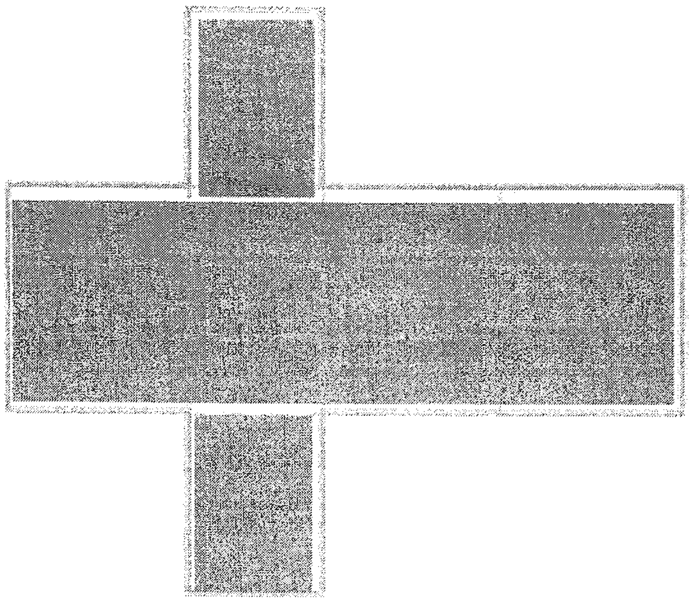
FIG. 5 is a view similar to the developed view shown in FIG. 4 with shading added to indicate the location of sealant and coating in one embodiment of the present invention.

FIG. 3 is a schematic view of a small part of the exterior wall 20 of a single office in a large multistory office building. More specifically, the opaque lower section 22 of the wall 20 is schematically illustrated to show that the lower section 22 of the wall 20 has a lower extremity coincident with the floor of an office that, for example, extends vertically upward perhaps 3 feet or more and is manufactured of reinforced concrete. The upper section 24 of the drawing schematically illustrates the upper section 24 of the exterior wall 20 of an office having an upper extremity coincident with the ceiling of the office. Typically, the upper section 24 includes two layers of glass.

Figure 4:
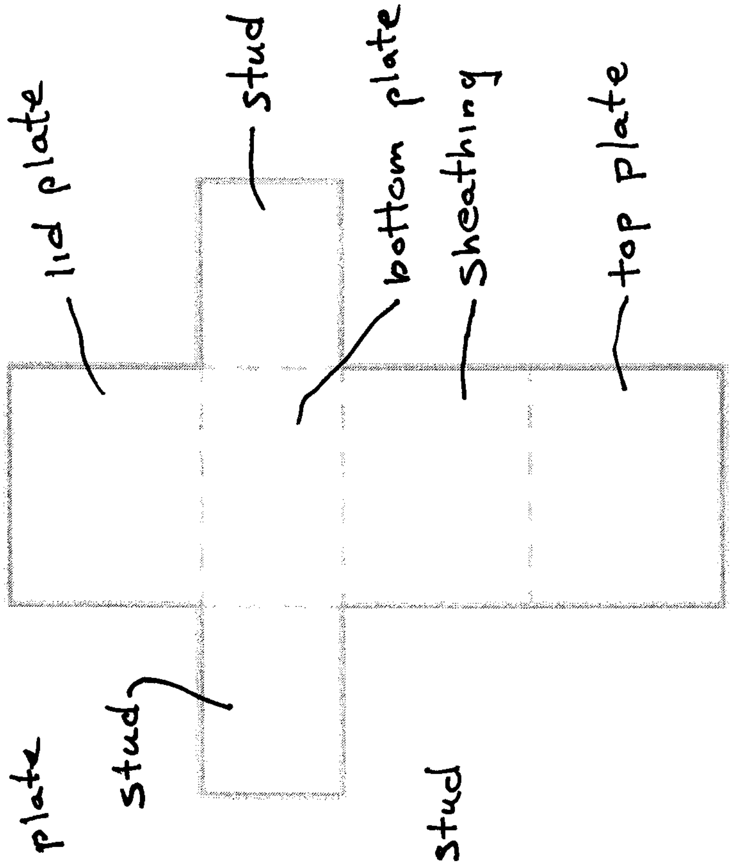
FIG. 4 is a developed view showing all of the faces of the enclosure illustrated in FIG. 3 in a single plane. More specifically, this view has the appearance of a cross in which a partly extends generally in a first direction and a second part which extends generally in a perpendicular direction. The intersection of the first and second parts is a rectangle corresponding to the bottom plate shown in FIG. 3.

In an embodiment of the invention shown in FIG. 4, there is shown a schematic exploded view of an embodiment of the lower extremity 22 illustrated in FIG. 3. This construction provides a chamber 12 formed in the hollow interior of part 28 which is sealed with the lid 26. The hollow space constitutes a chamber for use in accordance with the present invention.

In another embodiment this chamber of 26 and 28 can be made as one piece with hollow space.

In such embodiments, two vacuum insulating systems will be employed: one vacuum insulating system through concrete panels and a second between glass sheets. Basically, the entirety of the wall will act as a vacuum insulating system. Still other embodiments of the present invention in buildings that have all glass duplex layers utilize one or more vacuum pumps 14 connected to each space between layers of glass on the entire building exterior.

At low temperatures, heat transfer by radiation is very low, but at high temperatures, heat transfer by radiation is substantial. In this case, internal walls should be coated by reflective coating or a reflective layer should be attached to the wall.

Although the description herein is focused on buildings, those skilled in the art will recognize the applicability to motor vehicles, navy, cruise ships, aircraft, space ships including fuel tanks for space ships, storage of cryogenic materials as well as a myriad of other applications.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

It will be understood that, in general, terms used herein, and especially in the appended claims, are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "an imager" should typically be interpreted to mean "at least one imager"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "two images," or "a plurality of images," without other modifiers, typically means at least two images). Furthermore, in those instances where a phrase such as "at least one of A, B, and C," "at least one of A, B, or C," or "an [item] selected from the group consisting of A, B, and C," is used, in general, such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms or both terms. For example, the phrase "A or B" will be understood to include the possibilities of "A" or "B" or "A and B."

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the invention has been described in terms of various specific embodiments, those skilled in the art will recognize that the invention is practiced with modification within the spirit and scope of the claims.

What is claimed:

1. A method of providing a vacuum thermal and acoustical insulation system by modifying a space bounded by structural members selected from a group including studs, joists, rafters and walls consisting of:

providing air impermeability for said space with a sealant and a coating and a lining with materials selected from the group consisting of fabric and glass fabric which will cover and adhere to the structural members;"

providing a lid panel dimensioned and configured for engagement with the bounding structural members selected from the group consisting of studs, joists, rafters and walls; positioning the lid panel in air tight sealed engagement with structural members selected from the group consisting of studs, joists, rafters, and walls to close the space to prevent air flow into the space;

installing a connector having a first extremity communicating with the space and a second extremity communicating with the exterior of the space; connecting a vacuum pump to the second extremity of the connector; and removing air from the space with the vacuum pump.

* * * * *